Oct. 22, 1935. U. H. NOTTINGHAM Re. 19,739

MACHINE FOR WORKING FINE GOLD

Original Filed Sept. 14, 1933 4 Sheets-Sheet 1

Inventor

U. H. Nottingham

By Clarence O'Brien

Attorney

MACHINE FOR WORKING FINE GOLD

Original Filed Sept. 14, 1933 4 Sheets-Sheet 2

Inventor

U. H. Nottingham

By Clarence O'Brien

Attorney

Oct. 22, 1935. U. H. NOTTINGHAM Re. 19,739

MACHINE FOR WORKING FINE GOLD

Original Filed Sept. 14, 1933 4 Sheets-Sheet 3

Inventor

U. H. Nottingham

By Clarence O'Brien

Attorney

Oct. 22, 1935. U. H. NOTTINGHAM Re. 19,739

MACHINE FOR WORKING FINE GOLD

Original Filed Sept. 14, 1933 4 Sheets-Sheet 4

Inventor

U. H. Nottingham

By Clarence O'Brien

Attorney

Reissued Oct. 22, 1935 Re. 19,739

UNITED STATES PATENT OFFICE 19,739

MACHINE FOR WORKING FINE GOLD

Ulysses H. Nottingham, Bearcreek, Mont.

Original No. 1,961,428, dated June 5, 1934, Serial No. 689,472, September 14, 1933. Application for reissue July 13, 1934, Serial No. 735,052

2 Claims. (Cl. 209—183)

The present invention relates to a machine designed to work fine gold and has for its object to provide a structure which is efficient and reliable, compact and convenient, comparatively simple and inexpensive to manufacture and thoroughly efficient and reliable in use and operation.

Another important object of the invention resides in the provision of a machine of this nature using a mercury pan and providing means whereby the mixture of sand, gravel and gold is injected in the mercury at the bottom of the pan.

With the above and numerous other objects in view as will appear as the description proceeds, the invention consists in certain novel features of construction, and in the combination and arrangement of parts as will be hereinafter more fully described and claimed.

Figure 1:
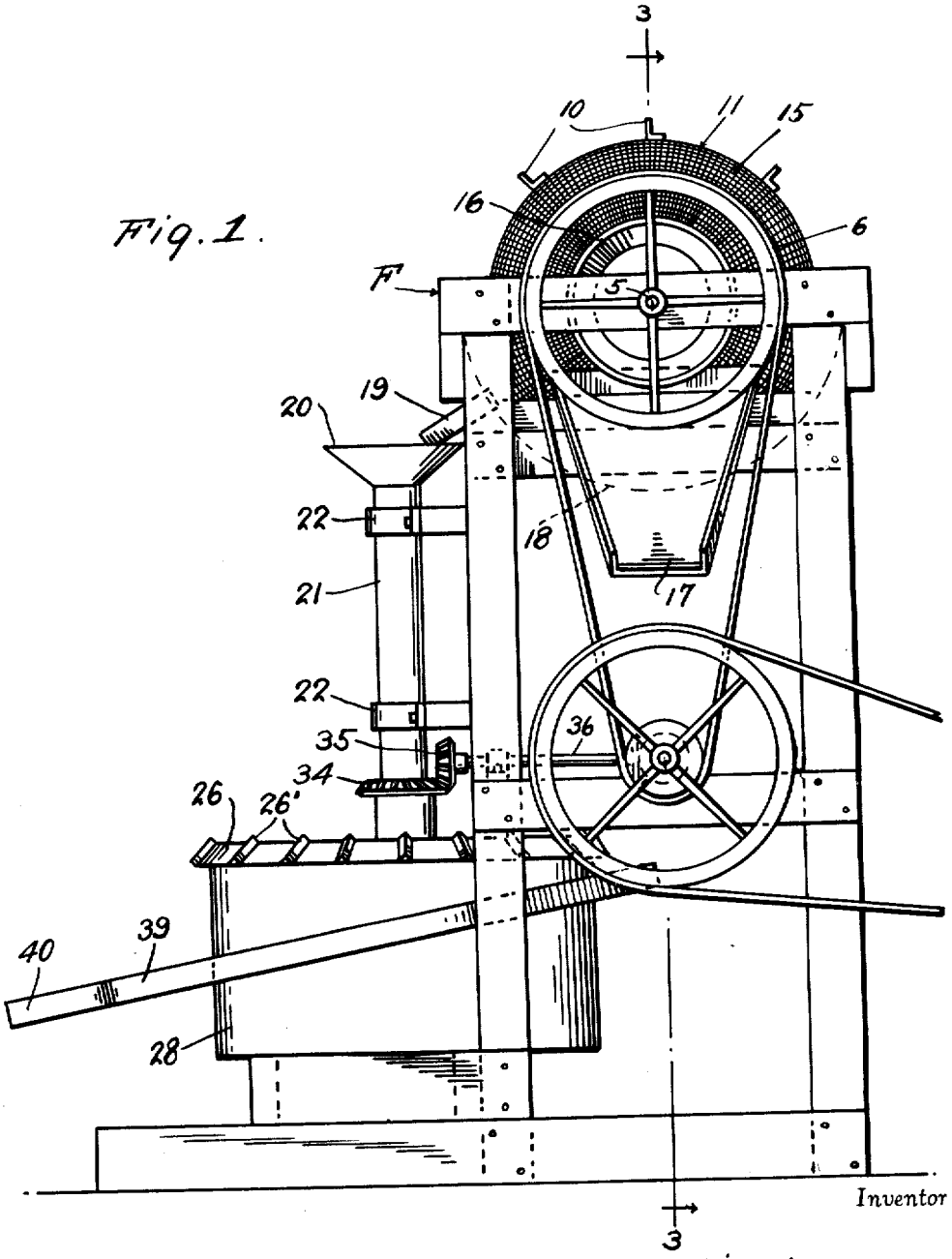
Figure 1 is a side elevation of a machine embodying the features of my invention.
Figure 2:
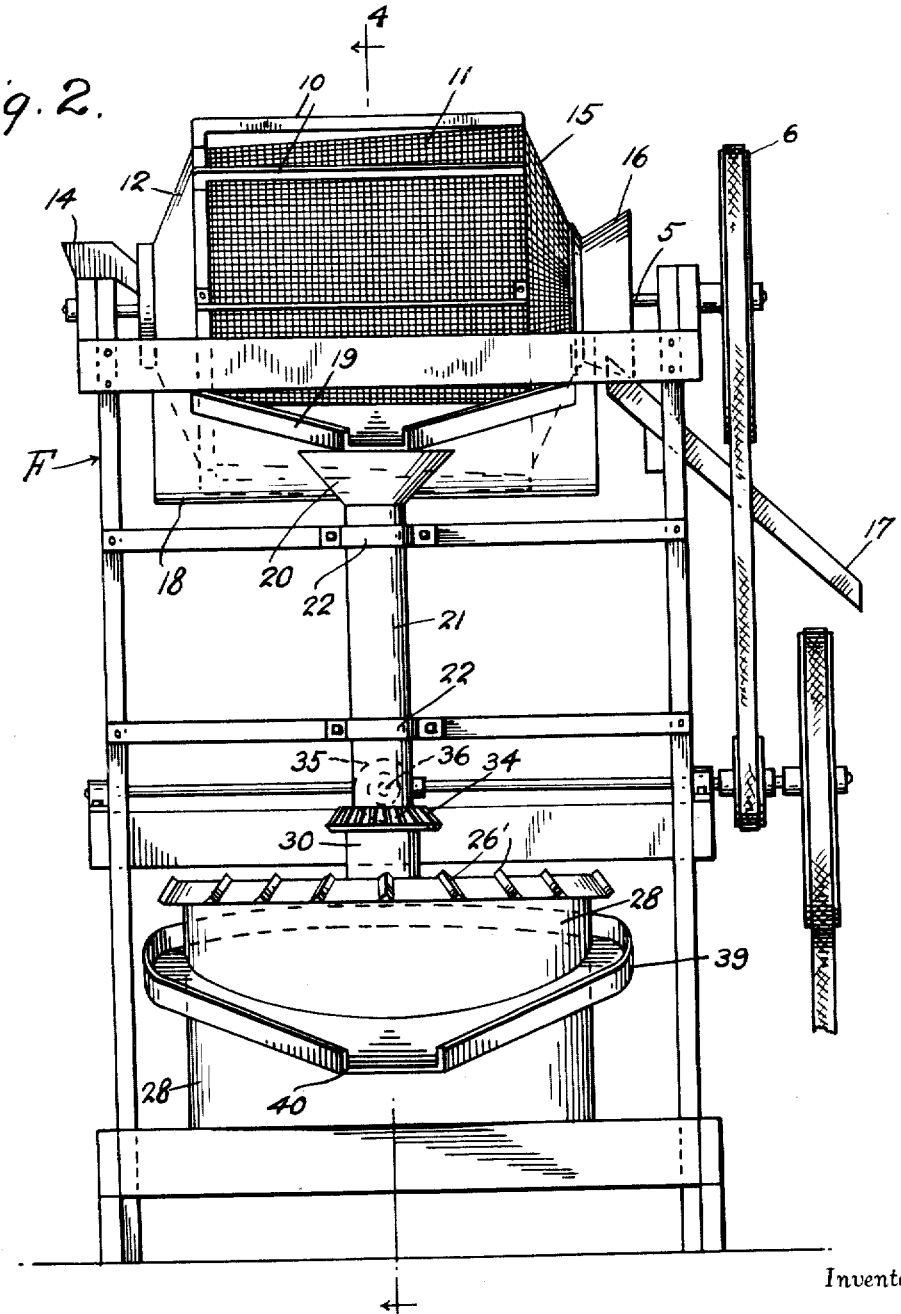
Figure 2 is a front elevation thereof.
Figure 3:
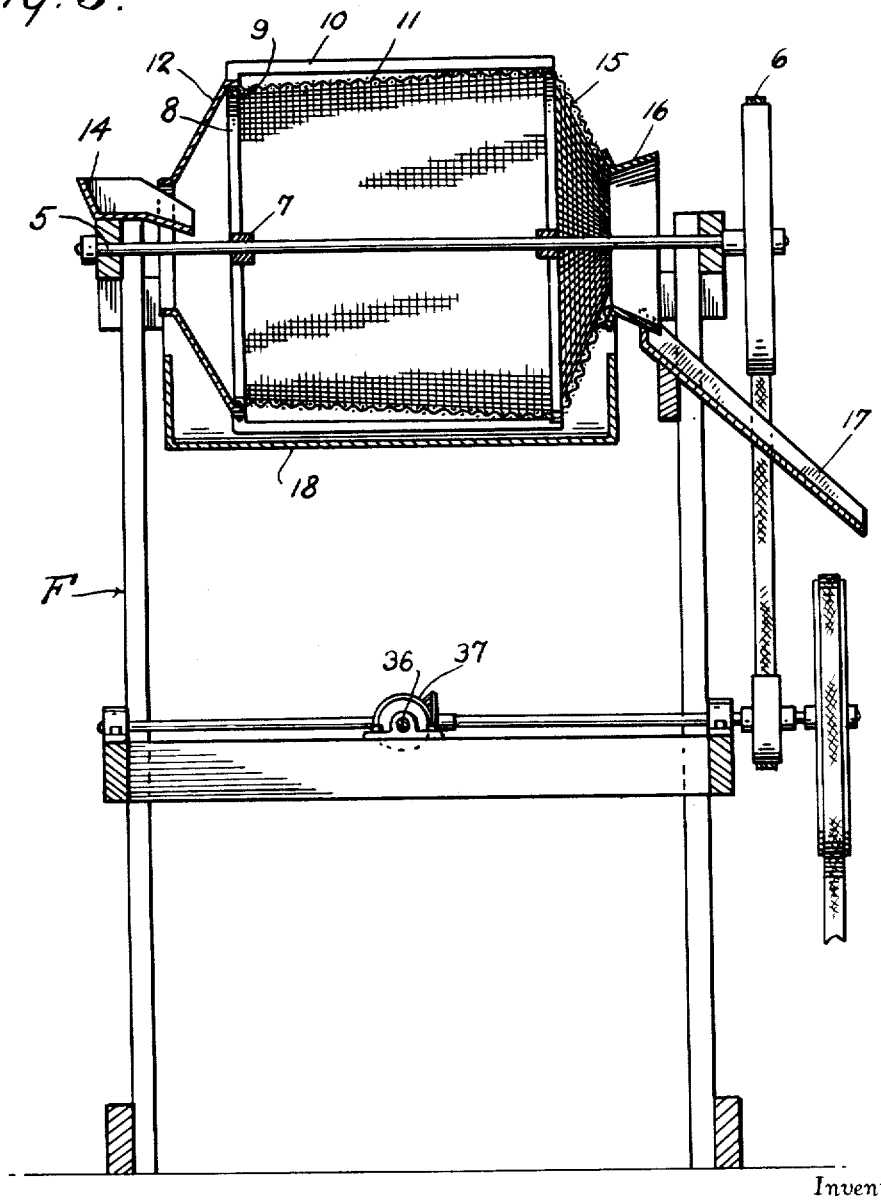
Figure 3 is a vertical section taken substantially on the line 3—3 of Figure 1.
Figure 4:
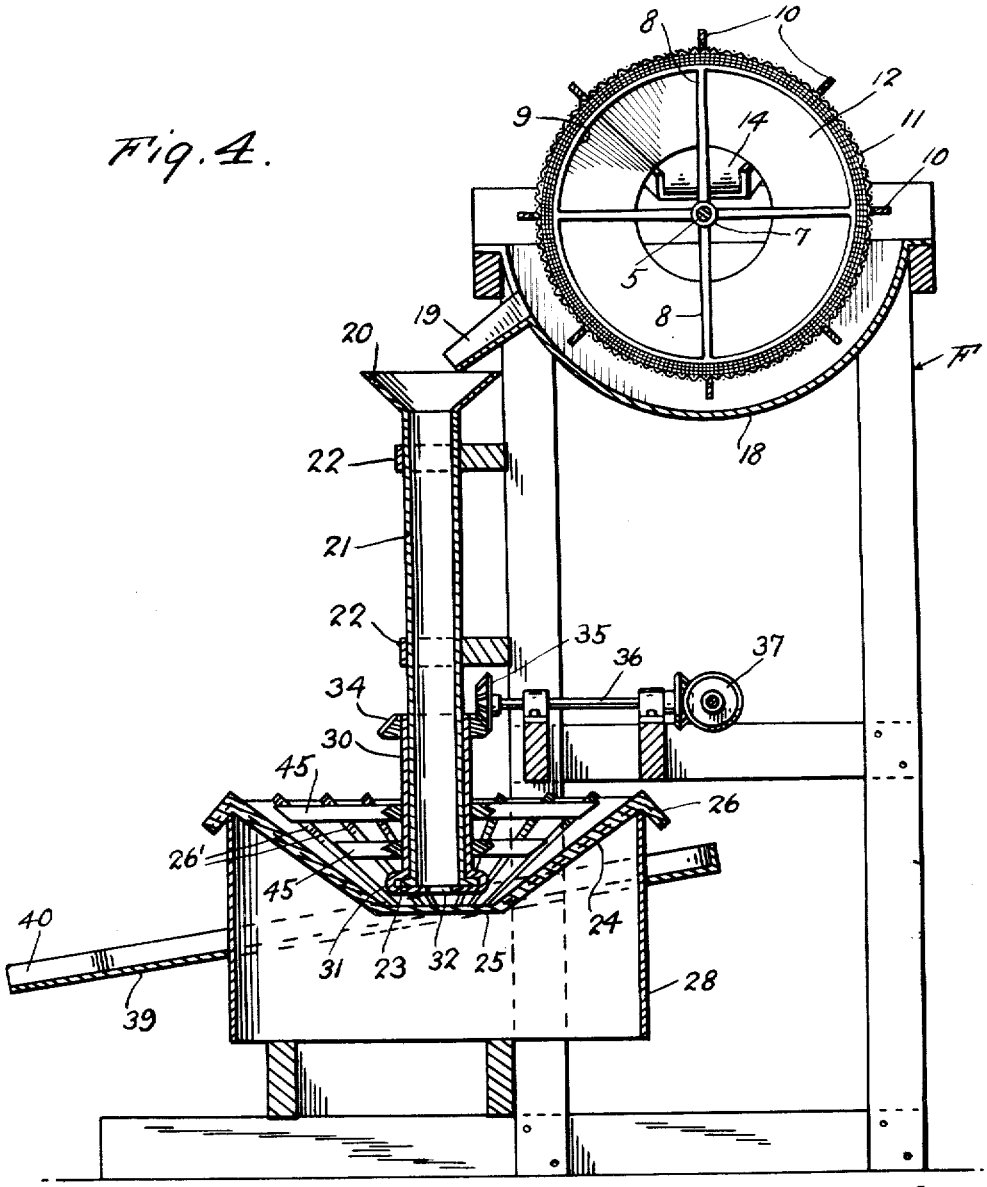
Figure 4 is a vertical section taken substantially on the line 4—4 of Figure 2.

Referring to the drawings in detail it will be seen that the character F denotes suitable framework for supporting the sides of the machine as hereinafter described. A shaft 5 is journalled across the top of the frame and is rotatable by suitable belt and pulley means 6. Hubs 7 are fixed to the shaft and have spokes 8 radiating therefrom and the ends of the spokes are connected by rings 9 across which are angle iron cleats 10. A foraminous drum 11 is mounted on the framework formed by the spokes 8 and the rings 9 and tapers toward one end. A funnel 12 is fixed to and extends outwardly from said end and into this funnel projects a trough 14. A tapering end 15 is provided on the other end of the drum and has attached thereto an outwardly flaring funnel 16 leading into an inclined trough 17 to take off the coarse material. A pan 18 is mounted in the framework F under the drum and is disposed concentrically therewith and from one side there inclines downwardly a trough 19 into the upwardly flared end 20 on a vertical tube 21 fixed stationarily in the framework F by suitable brackets 22. On the lower end of this stationary tube there is an outwardly extending annular flange located in the bottom portion of mercury pan P. This mercury pan P includes an inverted frustroconical wall 24, a bottom 25, and an outwardly and downwardly inclined annular flange 26 on the upper edge thereof. The inner surface of the wall 24 is provided with a plurality of ribs 26′ which extend over the upper surface of the flange 26 as is clearly illustrated in Figures 1 and 2. A cylindrical skirt 28 is used for supporting the mercury pan on the framework F.

A tube 30 is rotatable about the lower portion of the tube 21 and is formed on its lower end with a bearing casing 31 surrounding the flange 23 and the center of the bottom portion of this bearing casing has an opening 32. A beveled gear 34 is formed on the upper end of the rotatable tube 30 and meshes with a beveled pinion 35 on a shaft 36 operatively connected by suitable bearings 37 with the belt and pulley drive mechanism. A trough 39 extends about the skirt 28 under the flange 26 and merges into the outlet portion 40. This trough is inclined. With the machine in operation the sand and gravel are placed in the chute 14 to gravitate into the drum. Water is maintained in the water pan 18. The coarser particles of the mixture, exit through the funnel 16 and the chute 17. The mixture which passes through the mesh of the foraminous drum into the pan 18 overflows into the chute 19, the funnel 20 and gravitates down the stationary tube 21 and exits submerged into the mercury in the mercury pan.

Agitators 45 radiate from the rotating tube 30 into the mercury pan and gravel and sand are caused to overflow into the trough 39.

It is thought that the construction, operation, utility and advantages of this invention will now be quite apparent to those skilled in this art without a more detailed description thereof.

The present embodiment of the invention has been described in considerable detail merely for the purposes of exemplication since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. An amalgamator comprising a vertical, stationary tube, a second and shorter tube rotatable about the lower end portion of the stationary tube and equipped with agitating means, a mercury pan having a flared side wall, and into which the lower portions of said tubes extend and in which said agitating means is movable, an annular flange on the lower end of the stationary tube and disposed adjacent the bottom of said pan, and a bearing casing carried by the rotatable tube, surrounding said flange and having a bottom opposed to and spaced from the pan bottom and also having a central opening in said bottom; said bearing casing having its periphery spaced from the said side wall of the pan for the upward passage of substance jetted through said central opening.

2. An amalgamator comprising a vertical central stationary tube, a rotary tube surrounding the lower portion of the stationary tube and having means partially closing the lower end of the stationary tube and projecting radially outward and provided with a central discharge opening, agitating means carried by and extending outwardly from said rotary tube, and a mercury pan receiving the lower portion of the tubes and said agitating means and having a bottom spaced slightly below the discharge of the rotary tube and also having an inverted frustro-conical side wall spaced from said radially projecting means and also having at the inner side of said side wall spaced ribs.

ULYSSES H. NOTTINGHAM.